United States Patent
Pickett

(10) Patent No.: US 6,481,606 B2
(45) Date of Patent: Nov. 19, 2002

(54) SMALL ANIMAL CARRYING DEVICE

(76) Inventor: Sylvia Pickett, 304 Braxton Ridge, Winston-Salem, NC (US) 27104

( * ) Notice: Subject to any disclaimer, the term of this patent is extended or adjusted under 35 U.S.C. 154(b) by 0 days.

(21) Appl. No.: 09/740,551

(22) Filed: Dec. 20, 2000

(65) Prior Publication Data

US 2002/0074372 A1 Jun. 20, 2002

(51) Int. Cl.[7] .................................................. A45F 3/04
(52) U.S. Cl. ....................... 224/637; 224/640; 224/643; 224/652; 224/656; 119/416; 119/497; D30/109
(58) Field of Search ................................. 224/160, 637, 224/640, 643, 652, 656; 119/416, 496, 497; D30/109

(56) References Cited

U.S. PATENT DOCUMENTS

| | | | |
|---|---|---|---|
| 1,797,097 A | | 3/1931 | May |
| 2,969,767 A | | 1/1961 | Bassett |
| 3,481,517 A | * | 12/1969 | Aukerman .................. 224/160 |
| 3,850,144 A | * | 11/1974 | Springer et al. ............ 119/497 |
| 4,606,078 A | | 8/1986 | Tkacsik |
| 4,724,988 A | | 2/1988 | Tucker |
| 4,986,458 A | | 1/1991 | Linday |
| 5,050,998 A | * | 9/1991 | Wachtel ....................... 150/117 |
| 5,176,102 A | * | 1/1993 | Tracy ........................... 119/497 |
| D334,253 S | * | 3/1993 | Balzarini ...................... D3/214 |
| 5,211,321 A | * | 5/1993 | Rodriguez ...................... 2/102 |
| 5,419,281 A | * | 5/1995 | Williams et al. ............. 119/497 |
| 5,458,278 A | * | 10/1995 | LaConte ...................... 224/153 |
| 5,503,476 A | * | 4/1996 | Hamdan ....................... 224/585 |
| D370,090 S | * | 5/1996 | Coggins ...................... 224/160 |
| 5,579,966 A | * | 12/1996 | Krumweide et al. ......... 224/259 |
| D383,305 S | * | 9/1997 | Holstrom ..................... D3/216 |
| D387,510 S | * | 12/1997 | Way .......................... D30/109 |
| 5,803,331 A | * | 9/1998 | Thorne et al. .............. 224/160 |
| 6,158,641 A | * | 12/2000 | Eyman et al. .............. 224/161 |

* cited by examiner

*Primary Examiner*—Stephen K. Cronin
(74) *Attorney, Agent, or Firm*—Womble Carlyle Sandridge & Rice, PLLC

(57) ABSTRACT

A small animal carrying device incorporating a pouch section with a padded bottom. The pouch is closed by a drawstring and a harness assembly using padded crossover straps secures the device around the carrier's shoulders. An additional strap at the bottom of the pouch secures the device around the carrier's waist or lower torso. It can be worn in the front and back positions and contains a side pocket for carrying a leash or other accessories.

29 Claims, 3 Drawing Sheets

FIG. 3
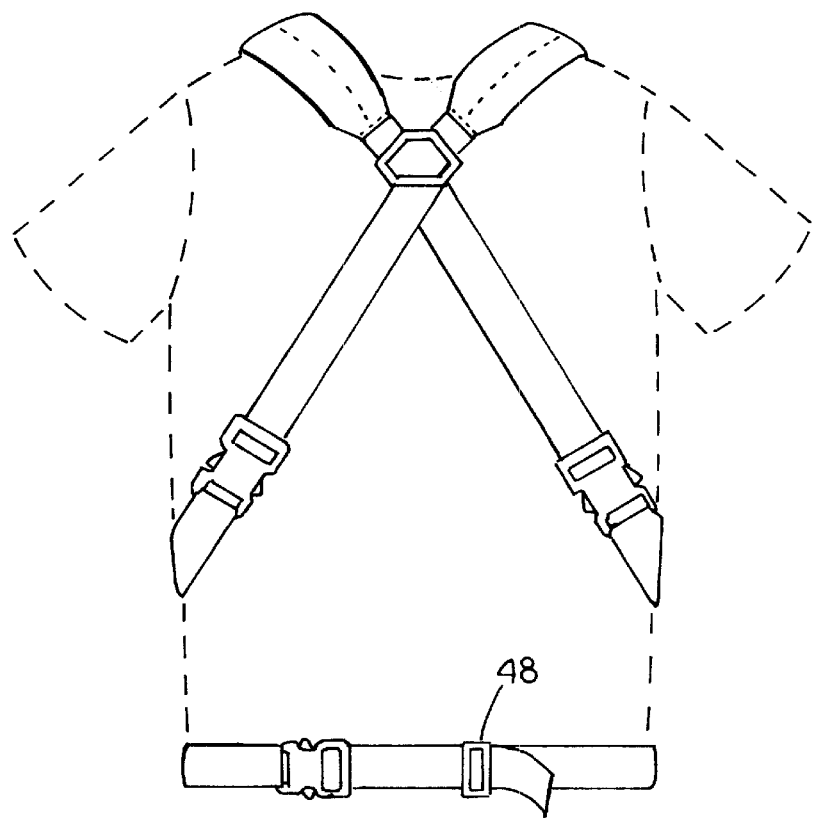
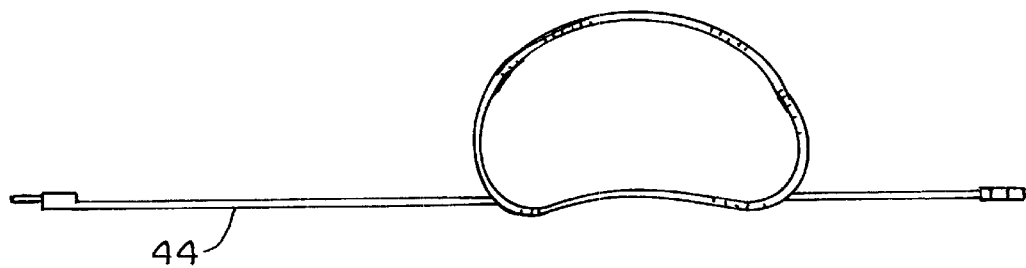
FIG. 4

SMALL ANIMAL CARRYING DEVICE

BACKGROUND OF THE INVENTION

1. Field of the Invention

The present invention relates to a small animal carrier of the soft type and more particularly to a small animal carrier provided with harness means for maintaining the carried animal in the front and back position so that the hands may be free.

2. Description of the Prior Art

Small animal carriers are generally firm or frame carriers having a handle that can be engaged by the hand of the carrier in much the same way a suitcase is carried. There are some soft carriers available, however these are usually designed to be carried in one position, usually the back or over one shoulder. Since continuously carrying a small animal in a fixed position such as on the back can eventually become tiresome, there is a desire to develop a small animal carrier that can be supported in multiple positions with even weight distribution such as the front as well as the back of the person carrying the device. It is to this desire that the present invention is directed.

SUMMARY OF THE INVENTION

It is an objective of the present invention to provide a small animal carrier that includes all of the advantages of prior art carriers and more and none of the disadvantages.

It is another objective of the present invention to provide a small animal carrier of the type described in which a supported animal can be moved, at will, from a position of frontal support to a position of back support and at all times during such movement, the animal remains snugly and securely seated in the pouch.

It is a further objective of the present invention to provide a small animal carrier of the type described where the weight of a supported animal is properly distributed to cause minimal inconvenience or discomfort to the carrier.

The present invention includes a pouch section with front and rear panels and a bottom padded panel secured to the front and rear panels. A harness assembly is secured to the back panel, and a closure means is cooperatively received by the pouch section, the harness having first and second crossover straps for securing the carrying device around and over the shoulders of the carrier designed to permit the carrier to maintain the carrying device and the carrier in front and back positions. An adjustable girth strap is attached to the rear panels of the pouch and is adapted to encircle the waist or lower torso of the carrier.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least on embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect.

Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objects of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

BRIEF DESCRIPTION OF THE DRAWINGS

FIG. 3 is a rear elevational view of the device shown in FIGS. 1 and 2; and

FIG. 4 is a top plan view of the device shown in FIGS. 1, 2 and 3.

DETAILED DESCRIPTION OF PREFERRED EMBODIMENT

Figure 1:
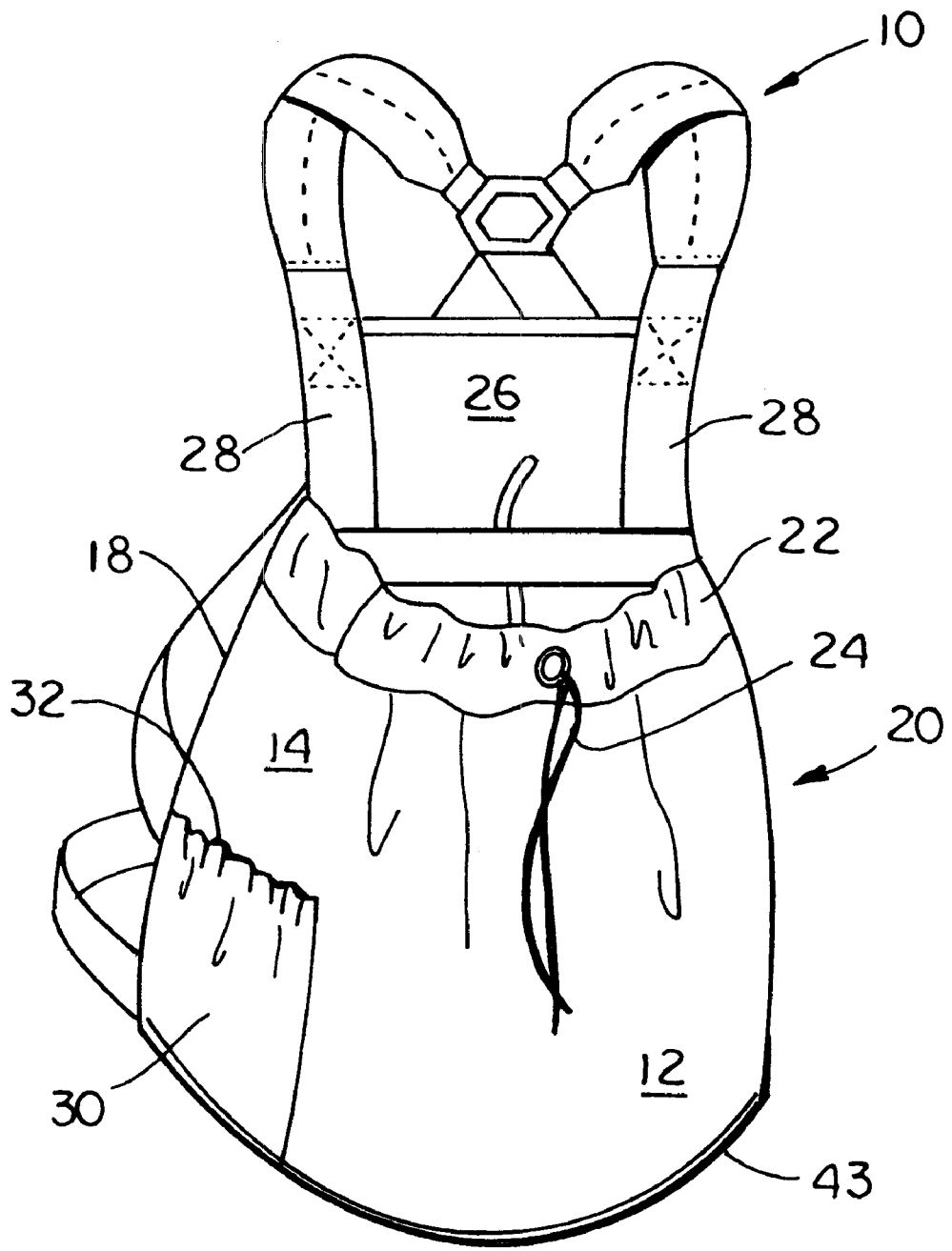
FIG. 1 is a perspective view of the small animal carrier comprising the present invention showing the forward portion of the carrier.
Figure 2:
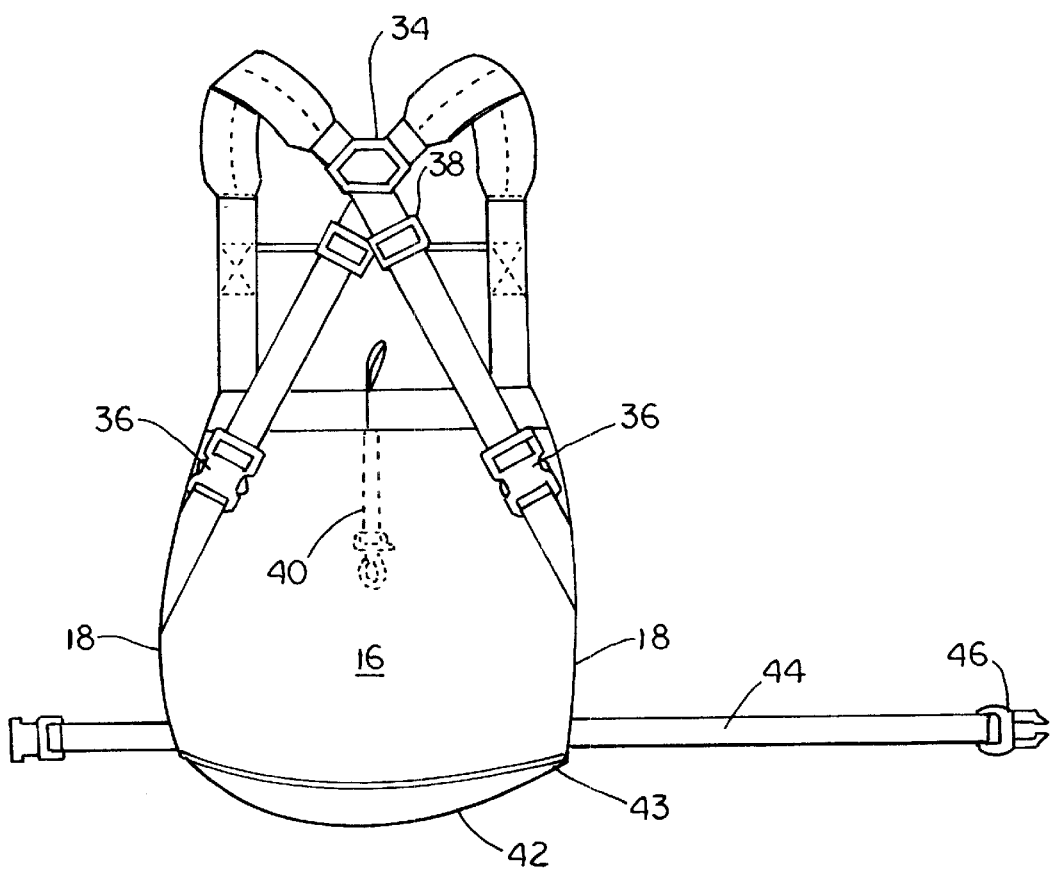
FIG. 2 is a perspective view of the small animal carrier comprising the present invention showing primarily the rear portion of the device.

Referring now to the drawings and particularly to FIG. 1, a small animal carrying device shown generally as 10 has a front panel 12 and a rear panel 16 all seamed together along their edges 18 to form a pouch 20. A doubled top 22 functions to house a drawstring 24 encircling the top of the bag and making it possible to tighten the top around the neck of the animal carried within. An upper rear panel or bib 26 connects to carrying straps 28 and provides a rear support for the animal's head as it resides within pouch 20 and also functions to hold the animal close to the carrier's body. A closure pocket 30 is affixed to one side of the pouch 20 and has elastic 32 within its upper folded edge to keep tension on the closure and hold it against the pouch 20.

The harness for carrying the device is formed of crossing straps 28 that connect midway along the back at a slip ring 34. Straps 28 are padded over the shoulder area for comfort during use. Straps 28 are joined to the pouch along the connected edges 18 of front and rear panels 12, 16. Straps 28 are releasable through a latching member 36 and may be shortened or lengthened by adjustment along the top part of member 36.

An inside safety ring 40 provides additional security in that it can be connected to the collar of the animal being carried.

Bottom 42 is secured to front panel 12 and rear panel 16 along edge 43 and has reinforcement and padding for the animal's comfort. As can be seen in FIG. 4, the padded bottom is kidney-shaped.

A girth belt 44 is joined to the pouch at edges 18 representing the junction between front panel 12 and rear panel 16. The girth strap 44 is releasable through a latching member 46 and adjustable through an adjusting sleeve 46 and 48. The adjustment here helps hold the extra length of strap tight against the main strap.

From the proceeding description, it can be seen that a small animal carrying device has been provided that will meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A device worn about the human torso for carrying small animals, comprising:
   (a) a pouch for holding the small animal, the pouch having a closed bottom and an open top, the closed bottom being arcuate-shaped to conform to the lower torso of the human wearer; and
   (b) a harness assembly having a plurality of straps for securing the device over the shoulders and about the torso of the wearer, each of the plurality of straps having a first end attached at the top of the pouch, and a second end attached between the bottom of the pouch and top of the pouch, as to evenly distribute the weight of the small animal about the shoulders and torso of the wearer, and wherein the device may be interchangeably worn about the front or back of the torso without removing the small animal from the device.

2. The device of claim 1, herein the closed bottom is kidney-shaped.

3. The device of claim 1, further including a leash attachment connected to the device for securing the leash of a small animal.

4. The device of claim 1, further including a supplemental waist harness to further support the device about the shoulders and lower torso of the wearer.

5. The device of claim 1, further including an upper panel extending between and attached to the plurality of straps, the upper panel for supporting the head of the animal and for holding the animal close to the torso of the wearer.

6. The device of claim 1, further including a slip ring for interconnectably adjusting the plurality of straps of the harness assembly with respect to one another.

7. The device of claim 1, wherein the open top of said pouch further includes a doubled portion for holding a drawstring.

8. The device of claim 7, further including a drawstring for supplementally restraining the small animal within said pouch.

9. The device of claim 1, further including a pocket attached to an outer portion of said pouch.

10. The device of claim 1, wherein the closed bottom is padded.

11. A device worn about the human torso for carrying small animals, comprising:
   (a) a pouch for holding the small animal, the pouch having a closed bottom portion and an open top, the closed bottom portion being kidney-shaped to conform to the lower torso of the human wearer;
   (b) a harness assembly having a plurality of straps for securing the device over the shoulders and about the torso of the wearer, each of the plurality of straps having a first end attached at the top of the pouch, and a second end attached between the bottom of the pouch and top of the pouch, as to evenly distribute the weight of the small animal about the shoulders and torso of the wearer; and
   (c) an upper panel extending between and attached to the plurality of straps, the upper panel for supporting the head of the animal and for holding the animal close to the torso of the wearer.

12. The device of claim 11, further including a leash attachment connected to the device for securing the leash of a small animal.

13. The device of claim 11, further including a supplemental waist harness to further support the device about the shoulders and lower torso of the wearer.

14. The device of claim 11, further including a slip ring for interconnectably adjusting the plurality of straps of the harness assembly with respect to one another.

15. The device of claim 11, wherein the open top of said pouch further includes a doubled portion for holding a drawstring.

16. The device of claim 15, further including a drawstring for supplementally restraining the small animal within said pouch.

17. The device of claim 11, further including a pocket attached to an outer portion of said pouch.

18. The device of claim 11, wherein the closed bottom portion is padded.

19. The device of claim 11, wherein the device may be interchangeably worn about the front or back of the torso without removing the small animal from the device.

20. A device worn about the human torso for carrying small animals, comprising:
   (a) a pouch for holding the small animal, the pouch having a closed bottom and an open top, the closed bottom being arcuate-shaped to conform to the lower torso of the human wearer;
   (b) a harness assembly having a plurality of straps for securing the device over the shoulders and about the torso of the wearer, each of the plurality of straps having a first end attached at the top of the pouch, and a second end attached between the bottom of the pouch and top of the pouch, as to evenly distribute the weight of the small animal about the shoulders and torso of the wearer; and
   (c) an upper panel extending between and attached to the plurality of straps, the upper panel for supporting the head of the animal and for holding the animal close to the torso of the wearer.

21. The device of claim 20, wherein the closed bottom is kidney-shaped.

22. The device of claim 20, further including a leash attachment connected to the device for securing the leash of a small animal.

23. The device of claim 20, further including a supplemental waist harness to further support the device about the shoulders and lower torso of the wearer.

24. The device of claim 20, further including a slip ring for interconnectably adjusting the plurality of straps of the harness assembly with respect to one another.

25. The device of claim 20, wherein the open top of said pouch further includes a doubled portion for holding a drawstring.

26. The device of claim 25, further including a drawstring for supplementally restraining the small animal within said pouch.

27. The device of claim 20, further including a pocket attached to an outer portion of said pouch.

28. The device of claim 20, wherein the closed bottom is padded.

29. The device of claim 20, wherein the device may be interchangeably worn about the front or back of the torso without removing the small animal from the device.

* * * * *